(12) United States Patent
Krishnamoorthy et al.

(10) Patent No.: US 7,332,883 B1
(45) Date of Patent: Feb. 19, 2008

(54) METHOD AND APPARATUS FOR INITIALIZING OPERATION OF A DISK DRIVE

(75) Inventors: Ravishanker Krishnamoorthy, Singapore (SG); Foo Leng Leong, Singapore (SG)

(73) Assignee: Marvell International Ltd., Hamilton (BM)

( * ) Notice: Subject to any disclaimer, the term of this patent is extended or adjusted under 35 U.S.C. 154(b) by 3 days.

(21) Appl. No.: 11/352,115

(22) Filed: Feb. 9, 2006

Related U.S. Application Data

(60) Provisional application No. 60/691,744, filed on Jun. 17, 2005.

(51) Int. Cl.
*H02P 1/00* (2006.01)

(52) U.S. Cl. ............... 318/268; 318/286; 318/271; 318/276; 318/277; 318/445

(58) Field of Classification Search ............. 318/254, 318/138, 439, 268, 286, 445, 271, 276, 277; 711/102, 103
See application file for complete search history.

(56) References Cited

U.S. PATENT DOCUMENTS

| | | | | |
|---|---|---|---|---|
| 4,876,491 A | * | 10/1989 | Squires et al. ............. | 318/138 |
| 4,903,195 A | * | 2/1990 | Honma ..................... | 710/52 |
| 5,798,623 A | * | 8/1998 | El-Sadi ..................... | 318/254 |
| 6,534,936 B2 | | 3/2003 | Messenger et al. ......... | 318/254 |
| 6,597,140 B2 | * | 7/2003 | Takayama et al. .......... | 318/445 |
| 6,664,749 B2 | | 12/2003 | Heydt et al. ............... | 318/254 |
| 6,744,587 B2 | | 6/2004 | Ang et al. .................. | 360/69 |
| 6,868,470 B1 | | 3/2005 | Azimi et al. ................ | 711/1 |
| 7,095,195 B2 | * | 8/2006 | Tagome et al. ............. | 318/268 |
| 2001/0053038 A1 | * | 12/2001 | Kagami et al. ............. | 360/75 |

* cited by examiner

*Primary Examiner*—Rita Leykin

(57) ABSTRACT

Disk drives such as hard (magnetic) disk drives take a certain amount of time to initialize and "spin up" to the operational rotational speed of the disk or disks, thereby creating a time lapse from power up to when data can first be read from or written to the disk drive. This time lapse can be reduced, whereby some tasks conventionally done sequentially instead are performed in parallel. For example, the motor controller that controls the spindle motor can perform its portion of the initialization beginning at the same time that the remaining electronic components, including the hard disk controller, begin their initialization process including downloading firmware. Additionally, other portions of the initialization process typically performed by firmware can be performed by dedicated circuitry or a bootstrap program in the motor controller and hard disk controller, thereby not requiring the relatively slow downloading of system firmware.

35 Claims, 14 Drawing Sheets

METHOD AND APPARATUS FOR INITIALIZING OPERATION OF A DISK DRIVE

CROSS-REFERENCE TO RELATED APPLICATION

This application claims the benefit of U.S. Provisional Application No. 60/691,744, filed Jun. 17, 2005, and incorporated herein by reference in its entirety.

BACKGROUND OF THE INVENTION

This invention relates to disk drives generally and more specifically to the initialization of disk drives, including disk drives with spindle motors.

Disk drives are well known in computer-related technology. One well-known type includes hard disk drives that use a rigid spinning magnetic recording medium and associated read/write head. Another type includes optical disk drives that use a spinning (rotating) optical recording medium and a corresponding optical (laser diode) read/write head. This disclosure relates to both types generally although most of the description is directed towards a magnetic (hard) disk drive.

In general for disk drives, the disk takes some time for initialization and spin-up to a desired operational speed, and associated delays may adversely affect performance depending on the requirements of the operational setting.

In the consumer electronic field, for example, MP3 music players typically include disk drives that are likely to shut down frequently in order to preserve battery power. Typically, songs are stored as files on the disk drive. When any one song is being played, the corresponding file is downloaded into a semiconductor memory buffer for the actual playing, and then the disk drive shuts down. When a user wants to listen to a new song that is not in the memory buffer, that song must be downloaded to the memory from the disk drive which must be started up. The resulting lag (e.g., perhaps a second or more), which is largely due to getting the spindle motor up to the operational speed, can be annoying to users.

These issues affect a number of technology areas where disk drives are employed for data storage and retrieval. In addition to MP3 players, applications for disk drives include a number of consumer devices including high definition television (HDTV), vehicle control systems, cell phones, set top boxes, and media players generally. Time delays can degrade performance in all these applications to varying degrees.

Thus, there is a need for improved initialization and control of disk drives and related media.

SUMMARY

In one embodiment of the present invention, a disk drive includes a spindle motor for rotating a disk, a motor controller associated with the spindle motor, and a drive controller for controlling at least reading data from the disk, and a method of initializing the disk drive includes the acts of determining an initial angular position of the spindle motor using circuitry in the motor controller, and synchronizing a speed of the spindle motor using circuitry in the drive controller. According to one aspect of this embodiment, both of these acts may precede completion of starting a control program executed by the drive controller. Further, the starting of the control program may be at about the same time as the act of determining the initial angular position. Further, the control program may include a set of firmware instructions executed by the drive controller. According to another aspect, the motor controller and drive controller may be on separate integrated circuits. According to another aspect, the disk drive may be a magnetic or optical disk drive. According to another aspect, the act of synchronizing may include obtaining a set of values from a memory associated with the motor controller, and using the values to synchronize the spindle motor speed. According to another aspect the method may further include the act of controlling a rotational speed of the spindle motor using the control program. According to another aspect, the drive controller may include a read channel and interface controller.

In another embodiment, an apparatus for controlling a disk drive having a spindle motor for rotating a disk includes a motor controller in communication with the spindle motor and including circuitry for determining an initial angular position of the spindle motor during initialization of the disk drive, and a drive controller for controlling at least reading from the disk and in communication with the motor controller, and including circuitry for synchronizing a speed of the spindle motor during the initialization of the disk drive. This embodiment may include aspects described above. According to another aspect, the determining an angular position and synchronizing may precede completion of starting a control program in the drive controller. Further, the starting of the control program may be at about the same time as the determining the initial angular position. Further, the drive controller may control a rotational speed of the spindle motor using the control program. Further, the control program may include a set of firmware instructions executed by the drive controller. According to another aspect, the motor controller and drive controller may be on separate integrated circuits. According to another aspect, the disk drive may be a magnetic or optical disk drive. According to another aspect, the synchronizing may include obtaining a set of values from a memory associated with the motor controller and using the values to synchronize the spindle motor speed. According to another aspect, the drive controller may include a read channel and interface controller circuitry. According to another aspect, the apparatus may further include the disk, the spindle motor, and a read/write head associated with the disk and in communication with an actuator.

In another embodiment, a disk drive apparatus includes: a disk for storing data; means for rotating the disk; means for controlling the means for rotating the disk and determining an initial angular position of the means for rotating during initialization of the disk drive apparatus; and means for controlling at least reading from the disk and synchronizing a speed of the means for rotating during the initialization. This embodiment may include aspects described above. According to another aspect, the means for rotating the disk includes a spindle motor. According to another aspect, the means for controlling the means for rotating the disk and determining an initial angular position of the means for rotating during initialization of the disk drive apparatus includes a motor controller having specialized circuitry for determining the initial angular position. According to another aspect, the means for controlling at least reading from the disk and synchronizing a speed of the means for rotating during the initialization includes a disk-drive controller having specialized circuit for implementing a blind spin up operation for the disk.

Other related embodiments include methods for controlling disk drives and computer-readable media that store computer programs that include instructions for controlling disk drives. By carrying out coordinated initialization operations on separate portions of a disk drive system, enhanced performance goals (e.g., related to the time required for initialization) can be achieved. In this way, the present invention enables improved initialization and control of disk drives and related media.

DETAILED DESCRIPTION OF EXEMPLARY EMBODIMENTS

Figure 1:
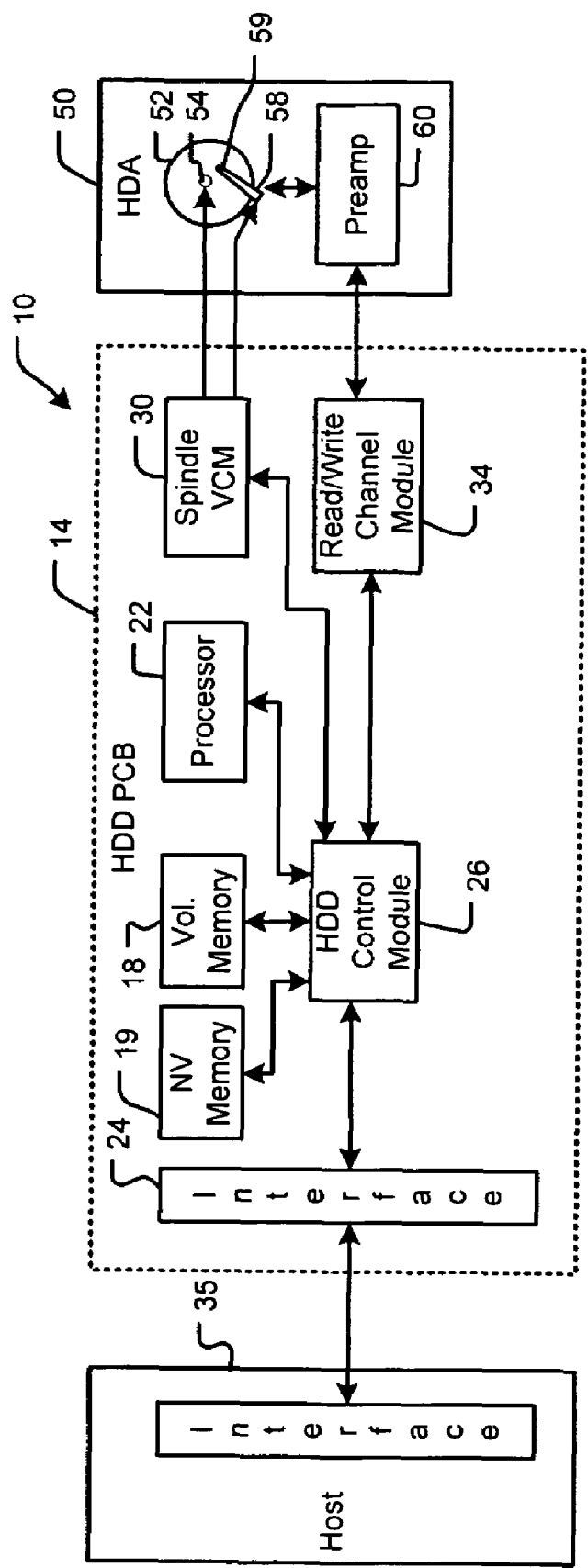
FIGS. 1 and 2 shows exemplary disk-drive systems.

As shown in FIG. 1, a Hard Disk Drive (HDD) system 10 includes a HDD Printed Circuit Board (PCB) 14. A buffer 18 stores read, write and/or volatile control data that is associated the control of the HDD system 10. The buffer 18 usually employs volatile memory having low latency. For example, SDRAM or other types of low latency memory may be used. Nonvolatile memory 19 such as flash memory may also be provided to store critical data such as nonvolatile control code.

A processor 22 arranged on the HDD PCB 14 performs data and/or control processing that is related to the operation of the HDD system 10. A hard disk control module (HDC) 26 communicates with an input/output interface 24 and with a spindle/voice coil motor (VCM) driver or module 30 and/or a read/write channel module 34. The HDC 26 coordinates control of the spindle/VCM driver 30, the read/write channel module 34 and the processor 22 and data input/output with a host 35 via the interface 24.

During write operations, the read/write channel module 34 encodes the data to be written onto a read/write device 59. The read/write channel module 34 processes the write signal for reliability and may apply, for example, error correction coding (ECC), run length limited coding (RLL), and the like. During read operations, the read/write channel module 34 converts an analog read signal output of the read/write device 59 to a digital read signal. The converted signal is then detected and decoded by known techniques to recover the data that was written on the HDD.

A hard disk drive assembly (HDDA) 50 includes one or more hard drive platters 52 that include magnetic coatings that store magnetic fields. The platters 52 are rotated by a spindle motor that is schematically shown at 54. Generally the spindle motor 54 rotates the hard drive platter 52 at a controlled speed during the read/write operations. One or more read/write arms 58 move relative to the platters 52 to read and/or write data to/from the hard drive platters 52. The spindle/VCM driver 30 controls the spindle motor 54, which rotates the platter 52. The spindle/VCM driver 30 also generates control signals that position the read/write arm 58, for example using a voice coil actuator, a stepper motor or any other suitable actuator.

The read/write device 59 is located near a distal end of the read/write arm 58. The read/write device 59 includes a write element such as an inductor that generates a magnetic field. The read/write device 59 also includes a read element (such as a magneto-resistive (MR) element) that senses the magnetic field on the platter 52. The HDDA 50 includes a preamp circuit 60 that amplifies the analog read/write signals. When reading data, the preamp circuit 60 amplifies low level signals from the read element and outputs the amplified signal to the read/write channel module 34. While writing data, a write current is generated that flows through the write element of the read/write device 59. The write current is switched to produce a magnetic field having a positive or negative polarity. The positive or negative polarity is stored by the hard drive platter 52 and is used to represent data.

Portions of the HDD system 10 may be implemented by a one or more integrated circuits (IC) or chips. For example, the processor 22 and the HDC 26 may be implemented by a single chip. The spindle/VCM driver 30 and/or the read/write channel module 34 may also be implemented by the same chip as the processor 22, the HDC 26 and/or by additional chips. Alternately, most of the HDD system 10 other than the HDDA 50 may be implemented as a system on chip (SOC).

Figure 2:
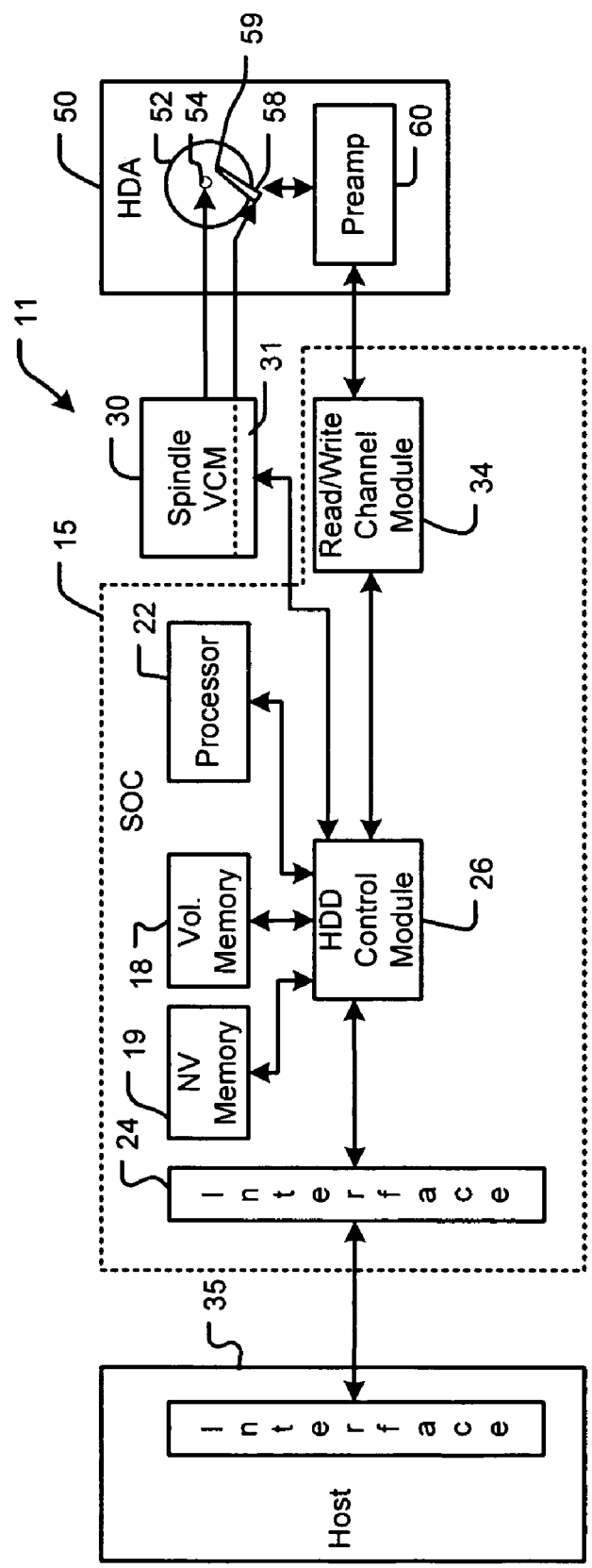

FIG. 2 shows a more specific example of an HDD system 11 derived from the system 10 of FIG. 1 with specific elements implemented as an SOC 15. Additionally, the Spindle/VCM driver 30, which is typically implemented as a separate IC, is further specified to include a motor controller 31 for controlling the spindle motor 54. This HDD system 11 is used for presenting specific embodiments of the present invention below. However, as noted above, alternative implementations related to FIG. 1 are possible, and the present invention is similarly applicable.

Operation of the spindle motor 54 is a primary focus of this disclosure. Generally the spindle/VCM driver 30 (or more specifically the motor controller 31) provides electric current to drive the spindle motor 54 and thereby maintains the necessary revolutions per minute (RPM) or angular velocity of the disk 52. Conventionally, the spindle/VCM driver 30 also supplies electric current that drives the voice coil motor (not shown) that moves the read/write device 32 (including a read/write head) on its gimbal assembly (not shown) for track seek operations and then holds the gimbal assembly on track for read and write operations.

The hard disk controller 26 generally manages transfer of data between the drive circuitry 26 and the host 35 for read and write operations. The controller 26 includes servo logic responsible for managing the positioning of the read/write device 59 when seeking (e.g., moving from one track to a non-adjacent track) and during tracking, which is staying on a single track. Many disk drives include multiple disk platters 52 and multiple read/write devices 59 often each with its own voice coil motor. Typically in this case the disks rotate together on the same shaft. For simplification this disclosure refers to a system with a single disk platter but it will be understood that this disclosure also pertains to multi-platter disk drives.

As noted above, disk drives take some time to initialize and "spin up" the rotational velocity of the spindle motor 54 to the desired operating velocity (i.e., rotating speed). In general, initialization includes stages such as start-up operations, spinning up to the proper rotating speed and eventually controlling the rotating speed. The overall time that the disk drive system takes for initialization determines the time lapse from the time of powering up the disk drive up to when data can be first read from or written to the disk 52.

When a disk drive is initialized (e.g., from a reset condition), the hard disk controller 26 executes an initialization sequence to place the disk drive in an operational state. This initialization sequence varies from disk drive to disk drive but generally involves initial tests (or start-up tests) of the various electronic sub-systems of the disk drive controller electronics, after which appropriate parameters and commands are loaded into the various elements shown in FIGS. 1 and 2 for use during disk drive operation. The spindle motor 54 is then accelerated to a speed that is sufficient to aerodynamically support the read/write device 59 over the disk platter 52, and the hard disk controller 26 then reports back to the host 35 that the disk drive is fully operationally and ready to receive data transfer commands.

Usually a disk drive initialization sequence occurs after the disk drive has been at rest, in which case the disk platter 52 is not spinning at all. Additionally, a momentary power drop can cause a reset condition, in which case again it is necessary to reinitialize even while the disk is still spinning. It is important to determine whether the disk is actually spinning upon initialization, since the state of the spindle motor 54 will determine the appropriate manner in which drive signals are applied by spindle/VCM drive 26 to accelerate the spindle motor 54 to the final desired operational velocity.

The spindle motor 54 and the drive signals for spindle/VCM drive 26 are relatively complex. The motor 54 is typically a multi-phase motor which must be driven by precisely determined signals. Typically the spindle motor 54 is a conventional three-phase motor including a stator having three windings and a rotor. The stator is fixed, and the rotor rotates relatively to the stator. The rotor conventionally is magnetic and provides a permanent magnetic field. The spindle motor 54 generates torque on the rotor when current flows through at least one of the windings. The torque depends on the magnitude and direction of current flow through the motor windings and an angular position of the rotor relative to the stator. This angular position of the rotor is also referred to as the position of the motor 54. The functional relationship between torque and current flow and angular position of the rotor is commonly depicted in the form of torque curves, each of which corresponds to a respective one of the set of commutation states of the motor 54.

Spin up operations in some hard disk drives include a so-called cogging operation which cogs or prepositions the spindle motor's rotor at a fixed angular phase position. This is necessary to prevent damage to the spindle motor 54, which can be damaged easily if the control signals are applied without knowing the actual rotational speed and position of the motor. Cogging is usually done as the very first step in the blind spin up, for example, by means of a relatively large motor drive current in the very first step in the blind table operations associated with the motor controller. However, alternative methods for initializing or sensing the rotor position are also possible including inductive sensing (e.g., for fluid bearing spindle motors).

Figure 3:
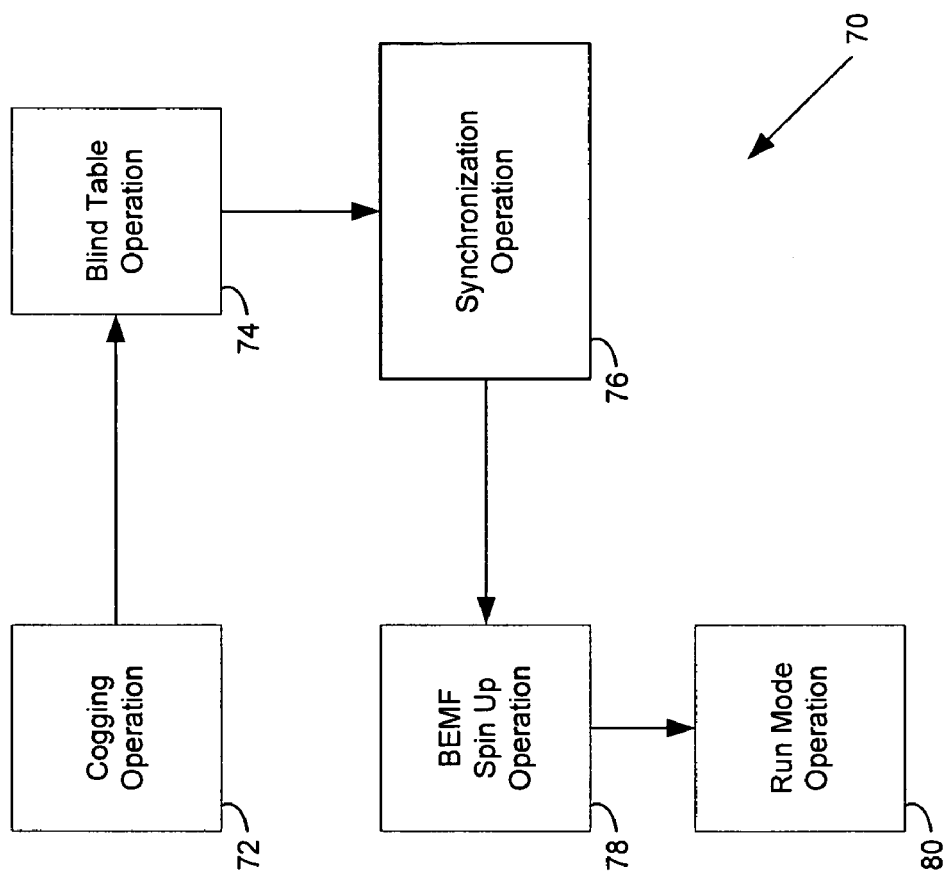
FIG. 3 shows an exemplary spin up operation for disk drives systems.

As shown in FIG. 3, a conventional spin-up operation 70 for a disk drive of the type shown in FIGS. 1 and 2 is carried out in stages. First, the cogging operation 72 is performed so that the motor 54 is at a zero revolutions per minute (RPM) spin rate. That is, the disk drive is shut down with no rotation of the disk platter 52. An exemplary cogging operation 72 may take, for example, one second or more, depending on the size of the drive, number of platters, and other factors. Then a blind table operation 74, where the speed of the spindle motor 54 is not monitored, is typically performed for an additional 0.3 seconds from the motor being at a speed of zero revolutions per minute to a speed of approximately 400 revolutions per minute. The blind table operation 74 starts the rotor at the cogged fixed angular position and a corresponding predetermined initial commutation state of the motor 54 is used to initially control the motor to generate a positive torque to move the disk platter 52 in a forward direction. The blind table stores the necessary delay value of the spin up sequence, specifically for a particular spindle motor inertia, in a nonvolatile memory module (e.g., read-only-memory (ROM)). At the approximately 400 RPM spin rate, a synchronization operation 76 occurs to synchronize the spindle motor 54 to permit monitoring of its spin rate. Once the spindle motor spin rate (speed) has been detected and the synchronization is completed, a back electromotive force (BEMF) spin up operation 78 begins at the spin rate of approximately 400 RPM up to the operating spin rate of typically 5,400 or 7,200 RPM. The BEMF spin up operation 78 thereafter monitors the BEMF of the spindle motor to thereby monitor the spin rate of the disk platter. (The BEMF sensor device that determines the actual angular position and rotation speed of the spindle motor is not shown in FIG. 1 but is conventional.) After reaching the operating spin rate, the spin up operation 78 is finished and control is handed off to the run mode operation 80 of the spindle/VCM driver 30. Of course, the various times and speeds given here are merely exemplary.

Figure 4:
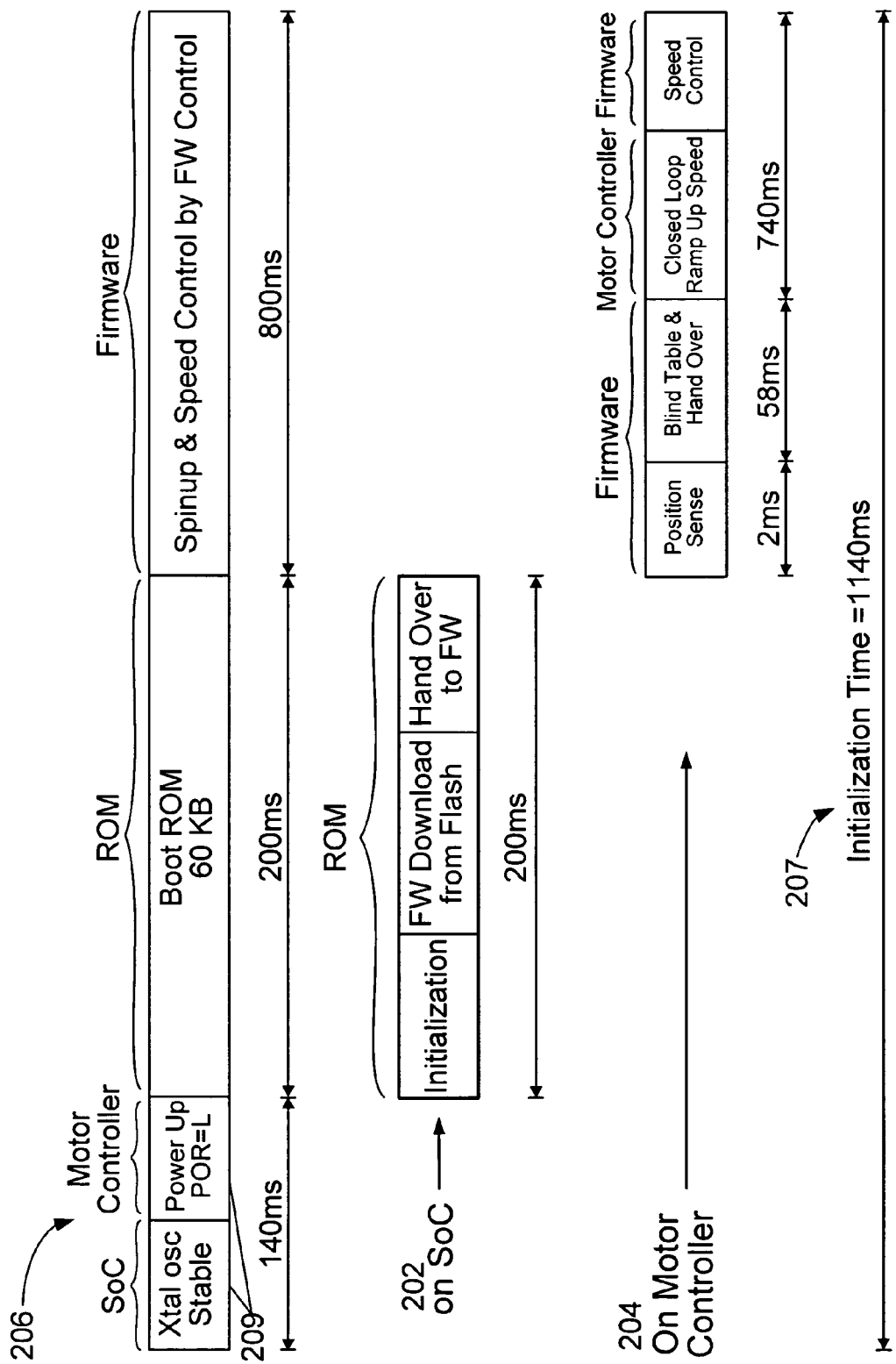
FIG. 4 shows an exemplary disk-drive initialization.

FIG. 4 shows a timeline characterization for a conventional method for initializing the HDD system 11 shown in FIG. 2, where the horizontal axis depicts passage of time in milliseconds. Each block indicates the time needed for a particular segment of the spin up operation, including operations 202 on the SOC 15, operations 204 on the motor controller 31, and overall operations 206. Each horizontal block in FIG. 4 is labeled to show where the functionality is resident in the disk drive system 11. For the overall operations 206, these are labeled as "SOC" for (general) operations on the SOC 15, "Motor Controller" for (general) operations on the motor controller 31, "ROM" for operations related to the execution of boot ROM on the SOC 15 (e.g., in the nonvolatile memory 19), and "Firmware" for operations related to firmware software downloaded during executing of the boot ROM on the SOC 15 and then executing on the SOC 15 or the motor controller 31. Similar labels are shown for operations 202 on the SOC 15 and operations 204 on the motor controller 31.

With reference to the overall operations 206, when the disk drive electronic components are first powered up, the first activity is crystal oscillator stabilization, where the corresponding crystal oscillator is conventionally is part of the SOC 15. This oscillator determines timing by generating precise timing signals using a vibrating crystal, as is well known in the field. The next block to the right is the power up of the motor controller 31 (e.g., power on reset (POR)). These two steps, which together take approximately 140 milliseconds, are denoted as power-up operations 209 for the SOC 15 and the motor controller 31.

The next step in the overall operations 206 is the ROM boot up. Typically, the SOC 15 with its hard disk controller 26 and interface controller 24 operate using firmware (a computer program), which is generally stored in a ROM portion of the nonvolatile memory 19 (e.g., a 60 KB file as shown in FIG. 3). A certain amount of time is required for the memory 19 to transfer the necessary firmware (instructions) and data (parameters) to the interface controller 24 and the hard disk controller 26. As shown below in the operations 202 on the SOC 15, this ROM boot up taking place in the SOC 15 includes three phases: an initialization, a download of the firmware instructions from the memory 19 (e.g., flash memory), and a handover of control to the firmware instructions.

The next step on the overall operations 206 is the spin up and speed control by the firmware downloaded into the SOC 15. This phase, which takes approximately 800 milliseconds, is shown in greater detail below for the corresponding operations 204 on the motor controller 31. The first phase is the position sensing (e.g., by inductive sensing), which for this example is a replacement for the conventional cogging operations discussed above. As shown this takes approximately 2 milliseconds as controlled by firmware. Next is the phase of the above described blind table operation and hand over of control to the firmware, taking approximately 58 milliseconds. This is followed by the phase of closed loop and ramp up of the speed of the motor 54, followed by the operating speed control phase. The motor control wave profile is fit to the actual spindle motor speed and tracked for any changes, hence this is referred to as being "closed loop ramp up speed." This is done in the motor controller 31. This is different from the speed control loop which is done by the SOC 15. As shown these three phases take a total of approximately 800 milliseconds.

As shown by the timeline in FIG. 4, the total initialization time 207 for the spindle motor 54 to be at operating speed is 1,140 milliseconds (i.e., just over one second), a delay that can be problematic in many operational settings for disk drives. Of course, the various times and speeds given here are merely exemplary.

Figure 5:
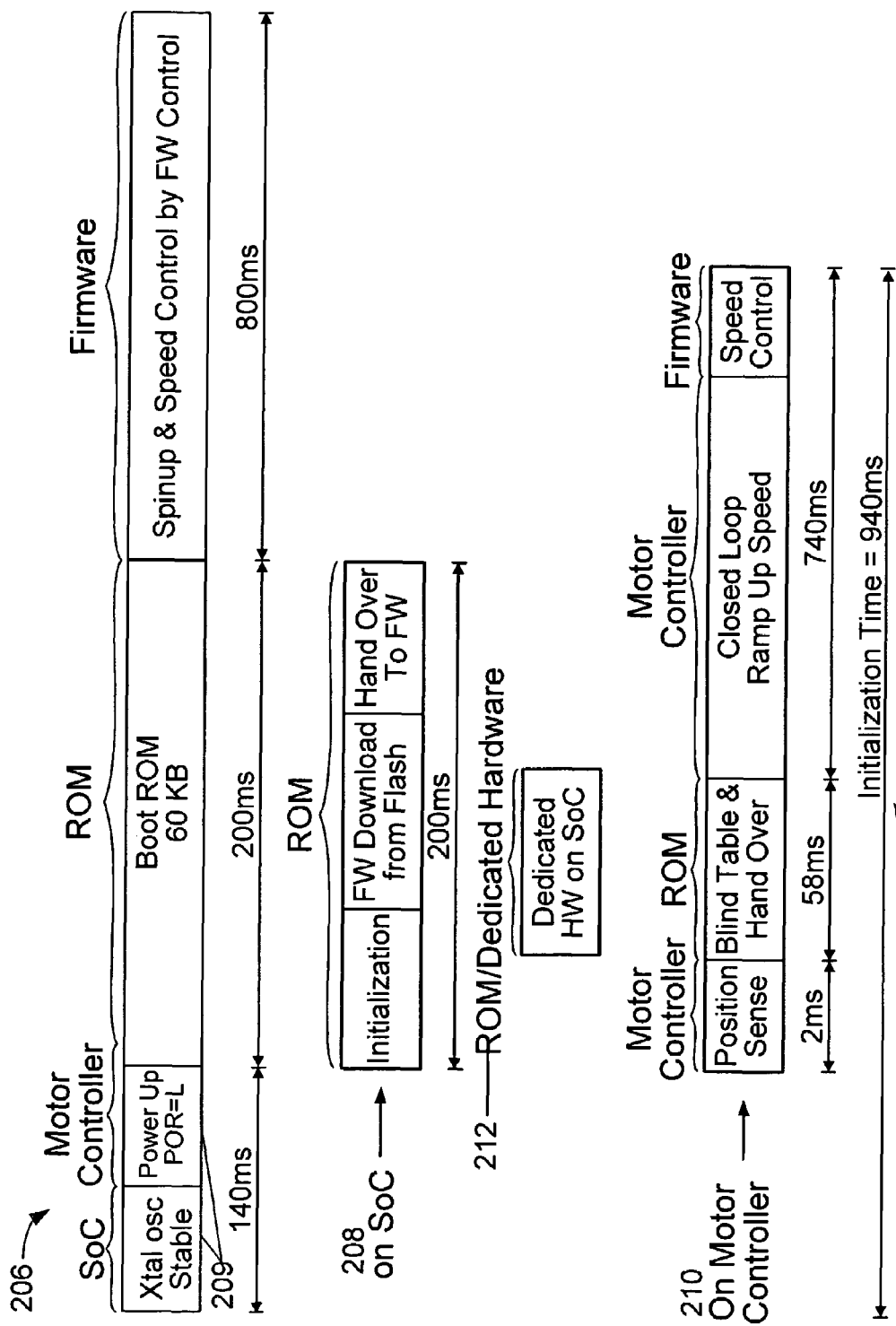
FIG. 5 shows a disk-drive initialization according to an embodiment of the present invention.

FIG. 5 shows a timeline characterization for a method of initializing the HDD system 11 according to an embodiment of he present invention. Similarly as in FIG. 4, the horizontal axis depicts passage of time in milliseconds. Further, each block indicates the time needed for a particular portion of the initialization and each block is labeled to show where the functionality is resident in the disk drive system. In addition to the labels discussed above with respect to FIG. 4 (i.e, "SOC", "Motor Controller", "ROM", and "Firmware"), an additional element 212 is labeled as "ROM/Dedicated Hardware" for operations related to the execution of boot ROM on the SOC 15 combined with additional dedicated hardware on the SOC 15.

FIG. 5 shows the nominal overall operations 206 from FIG. 4, where the steps of the initialization are shown linearly to reflect the case where the power-up operations 209 are followed by the operations 208 on the SOC 15 and then followed by the operations 210 on the motor controller 31. For this embodiment of the present invention, the power operations 209, which include the crystal oscillator stabilization on the SOC 15 and the power up of the motor controller 31, are followed by parallel operations 208, 210 on the SOC 15 and the motor controller 31. As discussed below, this parallel structure is accomplished through dedicated circuitry 212 on the SOC 15 and dedicated circuitry (not shown) on the motor controller 31.

Similarly as in FIG. 3, the operations 208 on the SOC 15 include an initialization, a download of the firmware instructions from the nonvolatile memory 19 (e.g., flash memory), and a handover of control to the firmware instructions, and the operations 210 on the motor controller 31 include position sensing, blind table operation and hand over of control to the firmware, closed loop and ramp up of the speed of the motor 54, and the operating speed control phase.

The operations 210 on the motor controller 31 begin with position sensing (e.g., BEMF-inductive sensing or alternative cogging operations) after the power goes high in the power-up operations 209. As noted above, accurate position determination is generally necessary to ensure that the blind table spin up (clockwise or counter clockwise, depending on the motor manufacturer), does not damage the spindle motor. Under these conditions, the position sensing to sense the initial position of the motor 54 cannot rely on the firmware downloaded from the boot ROM, which is not yet available. Instead, this functionality is accomplished by dedicated circuitry on the motor controller 31 (or equivalent circuitry elsewhere in the system 11). Thus, instead of the downloaded boot ROM firmware controlling the position sensing after the firmware has been initialized, this dedicated circuitry on the motor controller 31 controls the position sensing upon power up. The structure of this dedicated circuitry is, for example, a set of application specific logic gates and the main function is to determine the current position of the media (or disk platter) 52. In general, there are six steps in a disk drive; that is, there are six different positions for the platter 52 (e.g., step AC\ for phase A high and phase C low with phase B tri-stated). The dedicated circuitry automatically cycles through all six steps and sequentially reads back the position sense register value for each of the six steps. With this information, and some associated calculations, the dedicated circuitry is able to determine which step should be used first using the blind table timing.

After the correct angular position has been sensed by the dedicated circuitry in the motor controller 31, operations 210 on the motor controller 31 include the blind table spin up, operation which occurs by advancing the driving state of the motor controller 31 with a predetermined timing from the blind table or set of values stored in, for instance, a ROM element in the memory 19. In order to achieve this effect, the dedicated hardware 212 on the SOC 15 implements a bootstrap program for controlling the blind table spin-up operation. The structure of the bootstrap program implemented on the dedicated hardware 212 is typically a series of commands to be executed in sequence, after a predetermined delay between each command.

Figure 6:
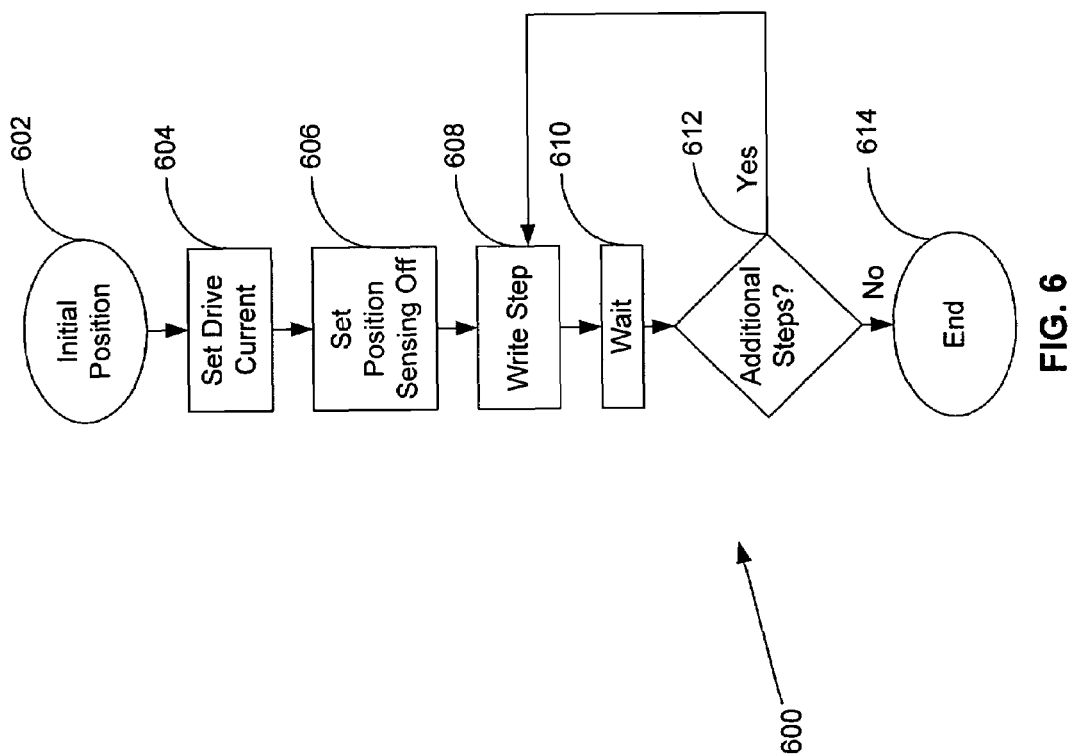
FIG. 6 shows a bootstrap program according to an embodiment of the present invention.

FIG. 6 shows an exemplary bootstrap program 600 according to an embodiment of the present invention. As an initialization, the program obtains the initial position 602 from the motor controller 31 (e.g., from the position sensing carried out on the motor controller 210). With this information, the boot strap program carries out the following operations: set the drive current 604; set position sensing off 606; write the first step 608; wait for a predetermined time using values from the blind table 610 (e.g., to complete the writing operation before proceeding); if there are additional steps 612, the next step is written 602. Finally, when all steps have been written 612 and the blind table spin up has been completed, the process is terminated 614. In general, the drive current is set according to how much current is needed to drive the motor (e.g., depending on inertias and other parameters), and waiting times depend on various system parameters including inertias and drive current. In general, position sensing is turned off to allow the disk to spin since if it is turned on the disk will not move (e.g., in tri-state mode).

After the blind table spin up has been completed, the motor controller 31 takes over control and ramps up to the rotational speed of the disk platter 52. The overall spin up time of course depends on the inertia of the disk platter governed primarily by the mass and size of the platter. Generally by the time the spindle motor 54 is spinning at the desired RPM (typically 90% of the target RPM value), the downloaded firmware operational on the motor controller 31 for controlling the speed of the platter. At that point the firmware takes over the speed control of the disk drive as is conventional (i.e, "Speed Control" operations 210 on motor controller).

As shown in FIG. 5, the operations 210 taking place on the motor controller 31 begin at the same time as the operations 208 on the SOC 15, and as a result the initialization time 213 is 940 milliseconds. This represents a savings of 200 milliseconds when this is compared to the initialization time 207 shown in FIG. 4. In this way the present invention advantageously reduces the time from the power-on time to the time that the first data can be read from or written to the disk drive. Of course, the various times and speeds given here are merely exemplary.

Figure 7:
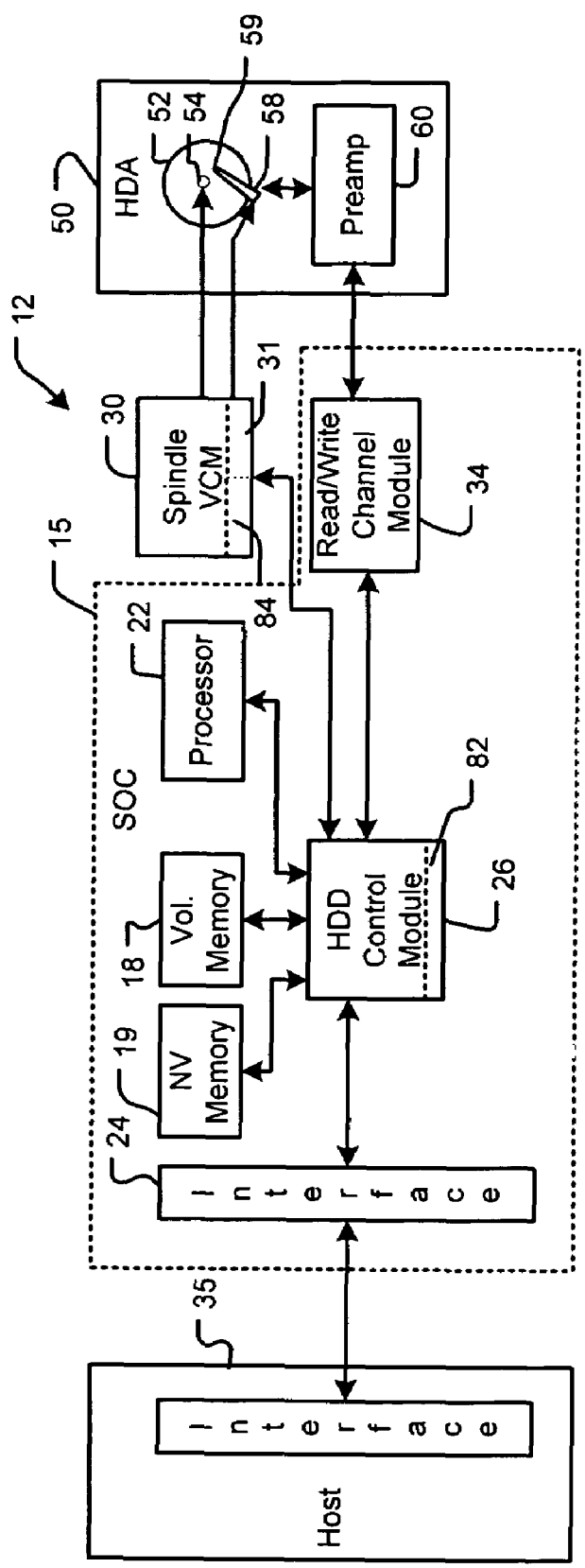
FIG. 7 shows a disk-drive system according to an embodiment of the present invention.

FIG. 7 shows a block diagram for a disk drive system 12 according to an embodiment of the present invention consistent with the timeline shown in FIG. 5. The HDD system 12 includes elements similar to the HDD system 11 shown in FIG. 2. In this embodiment the HDD control module 26 and the motor controller 31 are further specified so that the HDD control module 26 includes circuitry 82 for implementing the blind table spin up as described above and the motor controller 31 includes circuitry 84 for implementing the auto-inductive position sensing or similar determination of the spindle motor position as described above. For example, this circuitry 82, 84 may include hardware logic and memory modules such as flash memory. In this way the present invention enables a reduction in the initialization time 213 for a disk drive system 12 with relatively minor changes to conventional disk drive electronics.

Additional embodiments of the present invention relate to variations on the disk drive system 10 in FIG. 1 as understood by those skilled in the art. For example, the hard disk 52 could be replaced by another storage medium (e.g., an optical disk) together with corresponding related hardware. Additionally the read/write channel 34 could be replaced by a simpler read channel. Other embodiments relate to more specific application of disk-drive technology. For example, FIGS. 8A-8G show various exemplary embodiments of the present invention, including embodiments directed to hard disk drives, digital versatile discs, high definition television (HDTV), vehicle control systems, cell phones, set top boxes, and media players.

Figure 8A:
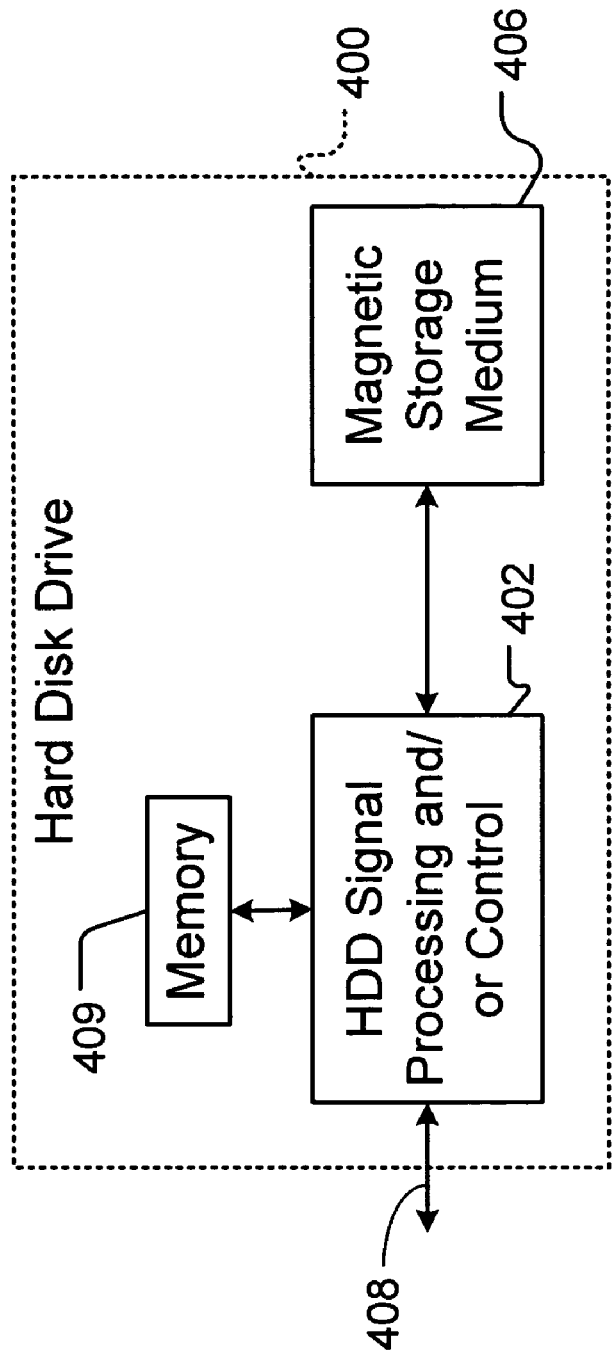
FIGS. 8A, 8B, 8C, 8D, 8E, 8F and 8G show embodiments of the present invention related to various consumer applications.

With reference to FIG. 8A, the present invention can be implemented in a hard disk drive 400 as part of the signal processing and/or control circuits 402 or the magnetic storage medium 406. In some implementations, the signal processing and/or control circuit 402 and/or other circuits (not shown) in the HDD 400 may process data, perform coding and/or encryption, perform calculations, and/or format data that is output to and/or received from a magnetic storage medium 406.

The HDD 400 may communicate with a host device (not shown) such as a computer, mobile computing devices such as personal digital assistants, cellular phones, media or MP3 players and the like, and/or other devices via one or more wired or wireless communication links 408. The HDD 400 may be connected to memory 409 such as random access memory (RAM), low latency nonvolatile memory such as flash memory, read only memory (ROM) and/or other suitable electronic data storage.

Figure 8B:
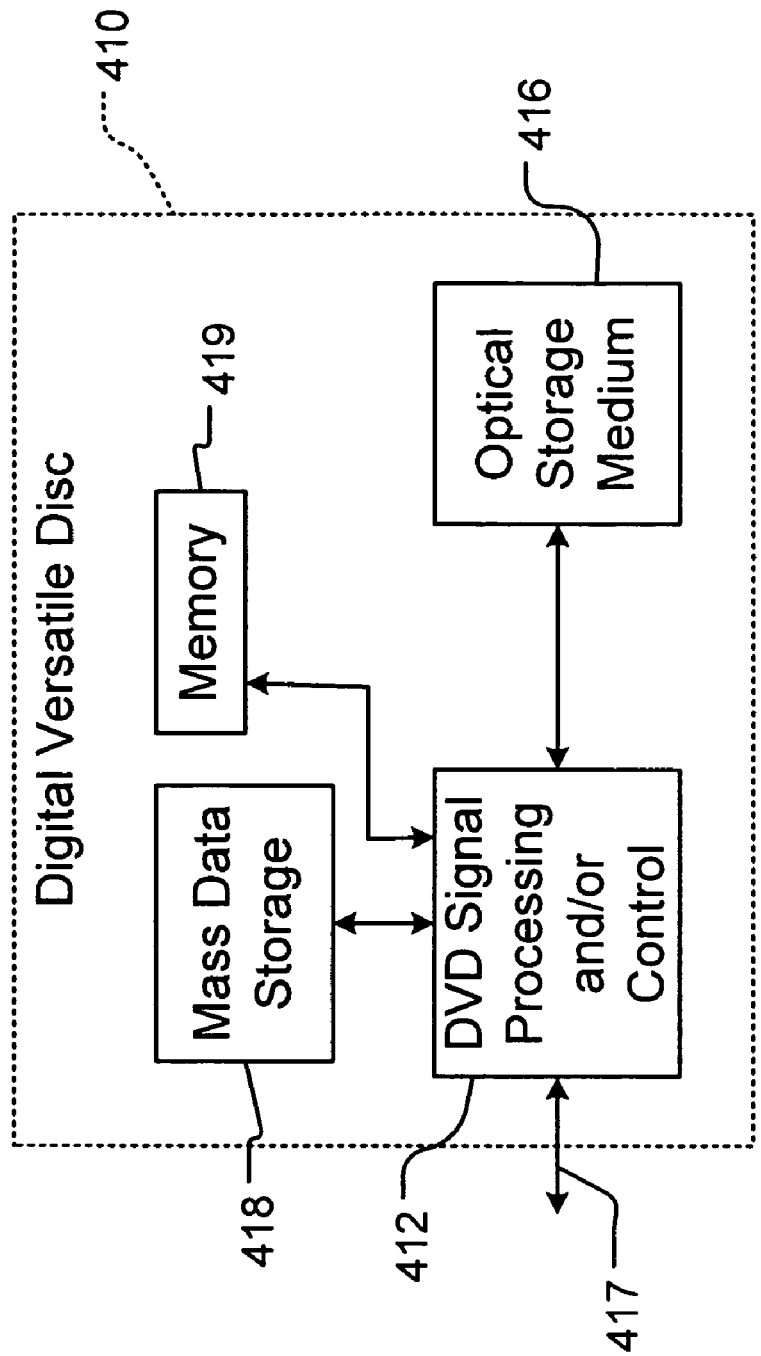

With reference to FIG. 8B, the present invention can be implemented in a digital versatile disc (DVD) drive 410 as part of the signal processing and/or control circuits 412, the mass data storage 418, or the optical storage medium 416. The signal processing and/or control circuit 412 and/or other circuits (not shown) in the DVD 410 may process data, perform coding and/or encryption, perform calculations, and/or format data that is read from and/or data written to an optical storage medium 416. In some implementations, the signal processing and/or control circuit 412 and/or other circuits (not shown) in the DVD 410 can also perform other functions such as encoding and/or decoding and/or any other signal processing functions associated with a DVD drive.

The DVD drive 410 may communicate with an output device (not shown) such as a computer, television or other device via one or more wired or wireless communication links 417. The DVD 410 may communicate with mass data storage 418 that stores data in a nonvolatile manner. The mass data storage 418 may include a hard disk drive (HDD). The HDD may have the configuration shown in FIG. 8A. The HDD may be a mini HDD that includes one or more platters having a diameter that is smaller than approximately 1.8". The DVD 410 may be connected to memory 419 such as RAM, ROM, low latency nonvolatile memory such as flash memory and/or other suitable electronic data storage.

Figure 8C:
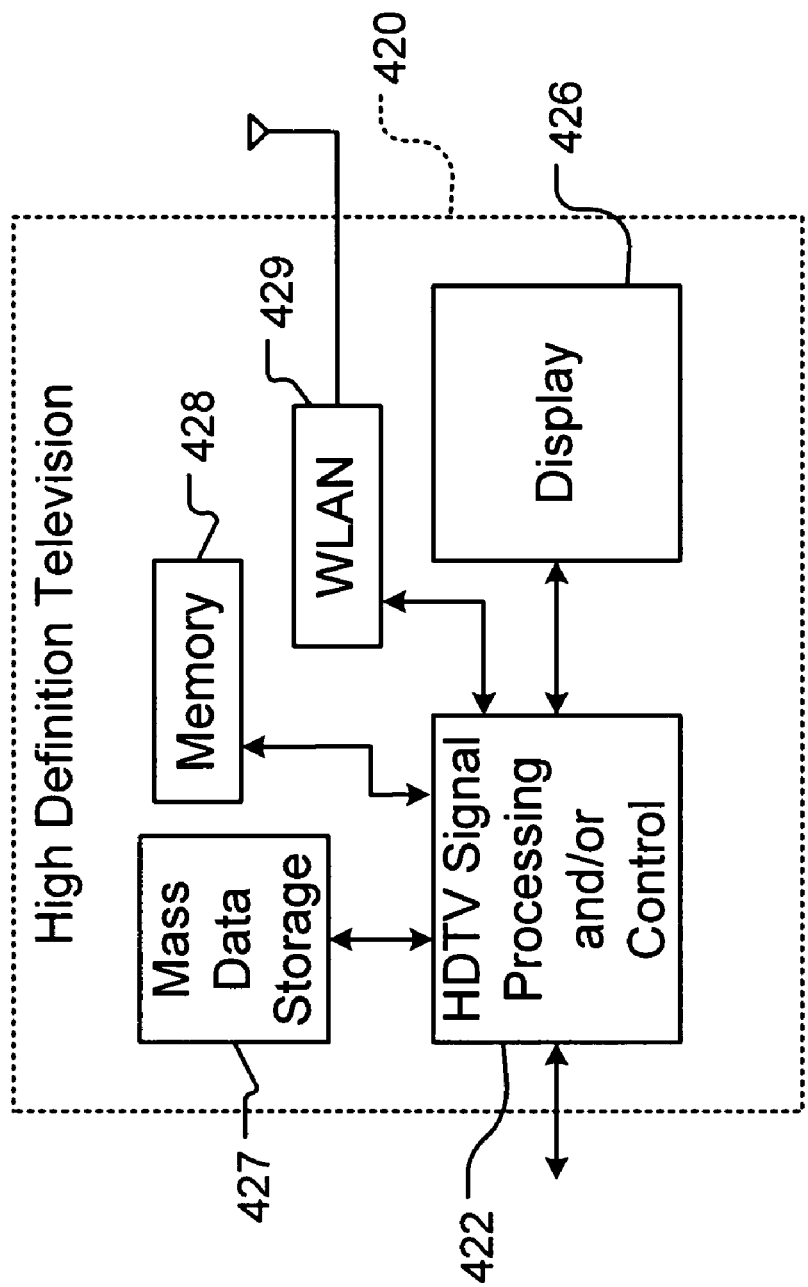

With reference to FIG. 8C, the present invention can be implemented in a high definition television (HDTV) 420 as part of the signal processing and/or control circuits 422 or the mass data storage 427. The HDTV 420 receives HDTV input signals in either a wired or wireless format and generates HDTV output signals for a display 426. In some implementations, signal processing circuit and/or control circuit 422 and/or other circuits (not shown) of the HDTV 420 may process data, perform coding and/or encryption, perform calculations, format data and/or perform any other type of HDTV processing that may be required.

The HDTV 420 may communicate with the mass data storage 427 that stores data in a nonvolatile manner such as optical and/or magnetic storage devices. At least one HDD may have the configuration shown in FIG. 8A and/or at least one DVD may have the configuration shown in FIG. 8B. The HDD may be a mini HDD that includes one or more platters having a diameter that is smaller than approximately 1.8". The HDTV 420 may be connected to memory 428 such as RAM, ROM, low latency nonvolatile memory such as flash memory and/or other suitable electronic data storage. The HDTV 420 also may support connections with a WLAN (wireless local area network) via a WLAN network interface 429.

Figure 8D:
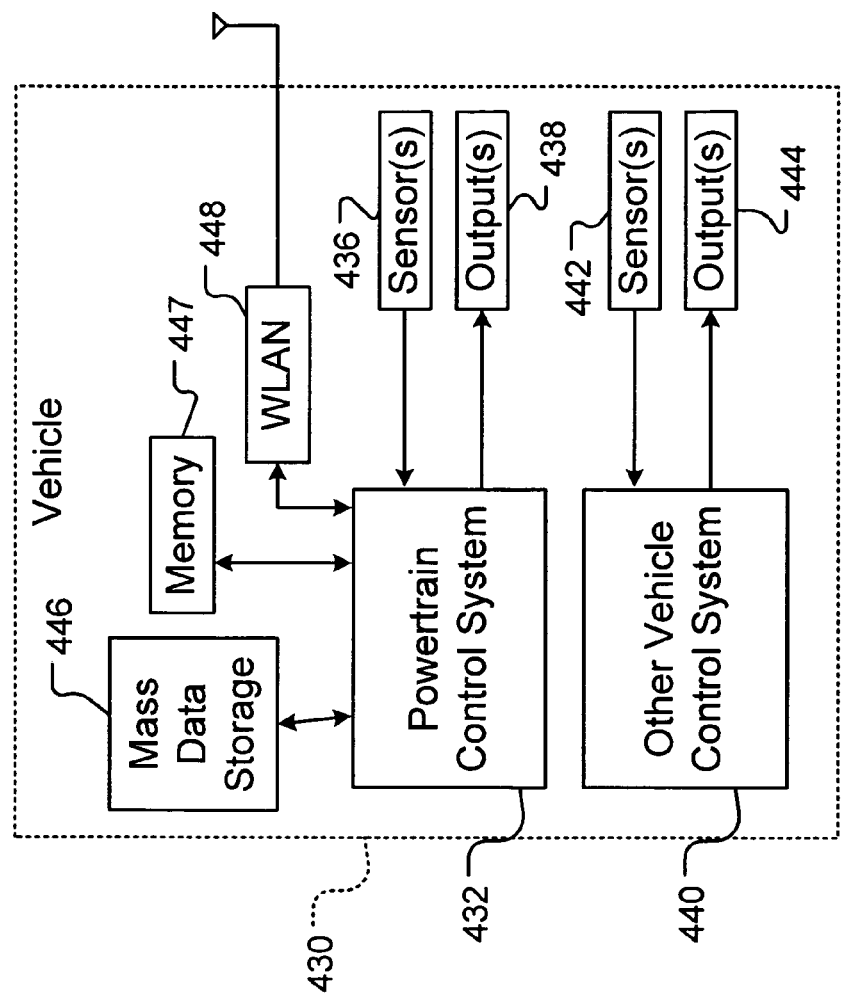

With reference to FIG. 8D, the present invention can be implemented in a vehicle 430 as part of a powertrain control system 432, other control system 440, or a mass data storage system 446. In some implementations, the present invention implement a powertrain control system 432 that receives inputs from one or more sensors such as temperature sensors, pressure sensors, rotational sensors, airflow sensors and/or any other suitable sensors and/or that generates one or more output control signals such as engine operating parameters, transmission operating parameters, and/or other control signals.

The present invention may also be implemented in other control systems 440 of the vehicle 430. The control system 440 may likewise receive signals from input sensors 442 and/or output control signals to one or more output devices 444. In some implementations, the control system 440 may be part of an anti-lock braking system (ABS), a navigation system, a telematics system, a vehicle telematics system, a lane departure system, an adaptive cruise control system, a vehicle entertainment system such as a stereo, DVD, compact disc and the like. Still other implementations are contemplated.

The powertrain control system 432 may communicate with mass data storage 446 that stores data in a nonvolatile manner. The mass data storage 446 may include optical and/or magnetic storage devices for example hard disk drives HDD and/or DVDs. At least one HDD may have the configuration shown in FIG. 8A and/or at least one DVD may have the configuration shown in FIG. 8B. The HDD may be a mini HDD that includes one or more platters having a diameter that is smaller than approximately 1.8". The powertrain control system 432 may be connected to memory 447 such as RAM, ROM, low latency nonvolatile memory such as flash memory and/or other suitable electronic data storage. The powertrain control system 432 also may support connections with a WLAN via a WLAN network interface 448. The control system 440 may also include mass data storage, memory and/or a WLAN interface (all not shown).

Figure 8E:
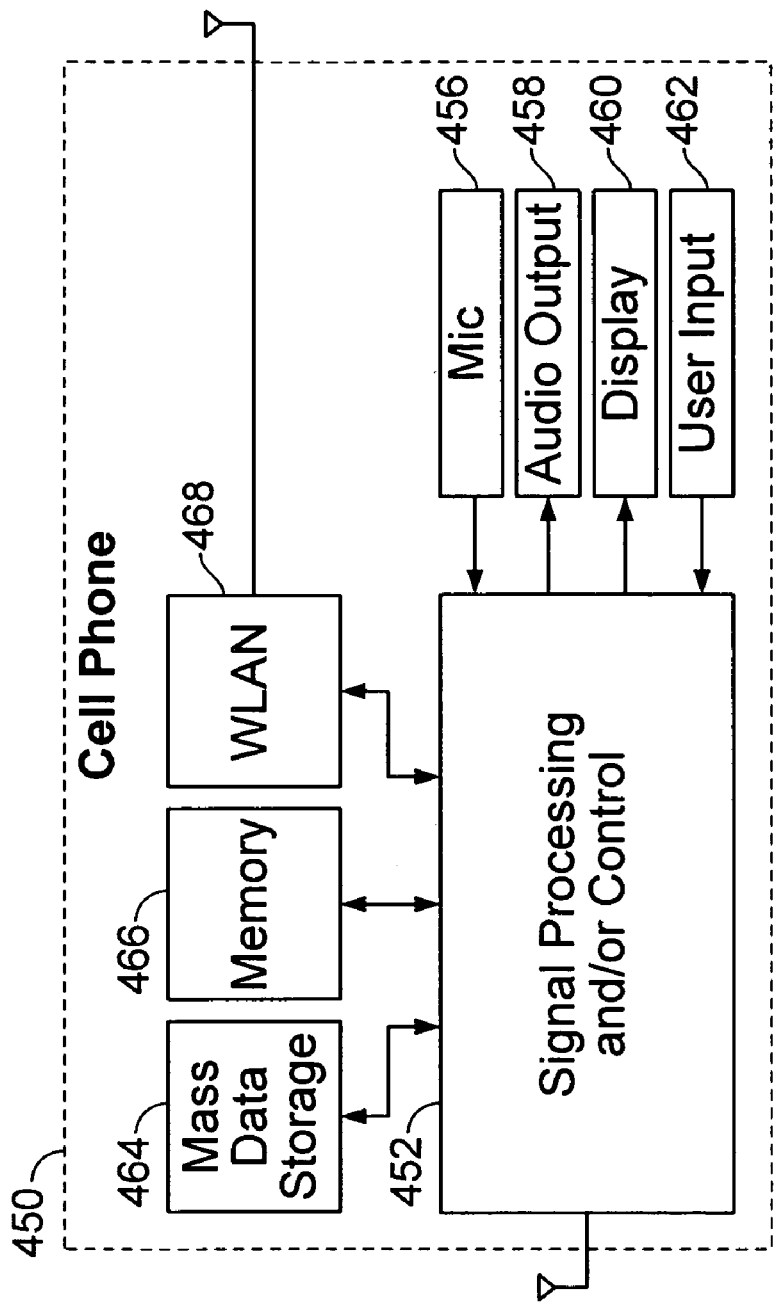

With reference to FIG. 8E, the present invention can be implemented in a cellular phone 450 as part of the signal processing and/or control circuits 452 or the mass data storage 464. In some implementations, the cellular phone 450 includes a microphone 456, an audio output 458 such as a speaker and/or audio output jack, a display 460 and/or an input device 462 such as a keypad, pointing device, voice actuation and/or other input device. The signal processing and/or control circuits 452 and/or other circuits (not shown) in the cellular phone 450 may process data, perform coding and/or encryption, perform calculations, format data and/or perform other cellular phone functions.

The cellular phone 450 may communicate with mass data storage 464 that stores data in a nonvolatile manner such as optical and/or magnetic storage devices for example hard disk drives HDD and/or DVDs. At least one HDD may have the configuration shown in FIG. 8A and/or at least one DVD may have the configuration shown in FIG. 8B. The HDD may be a mini HDD that includes one or more platters having a diameter that is smaller than approximately 1.8". The cellular phone 450 may be connected to memory 466 such as RAM, ROM, low latency nonvolatile memory such as flash memory and/or other suitable electronic data storage. The cellular phone 450 also may support connections with a WLAN via a WLAN network interface 468 or other antenna connections.

Figure 8F:
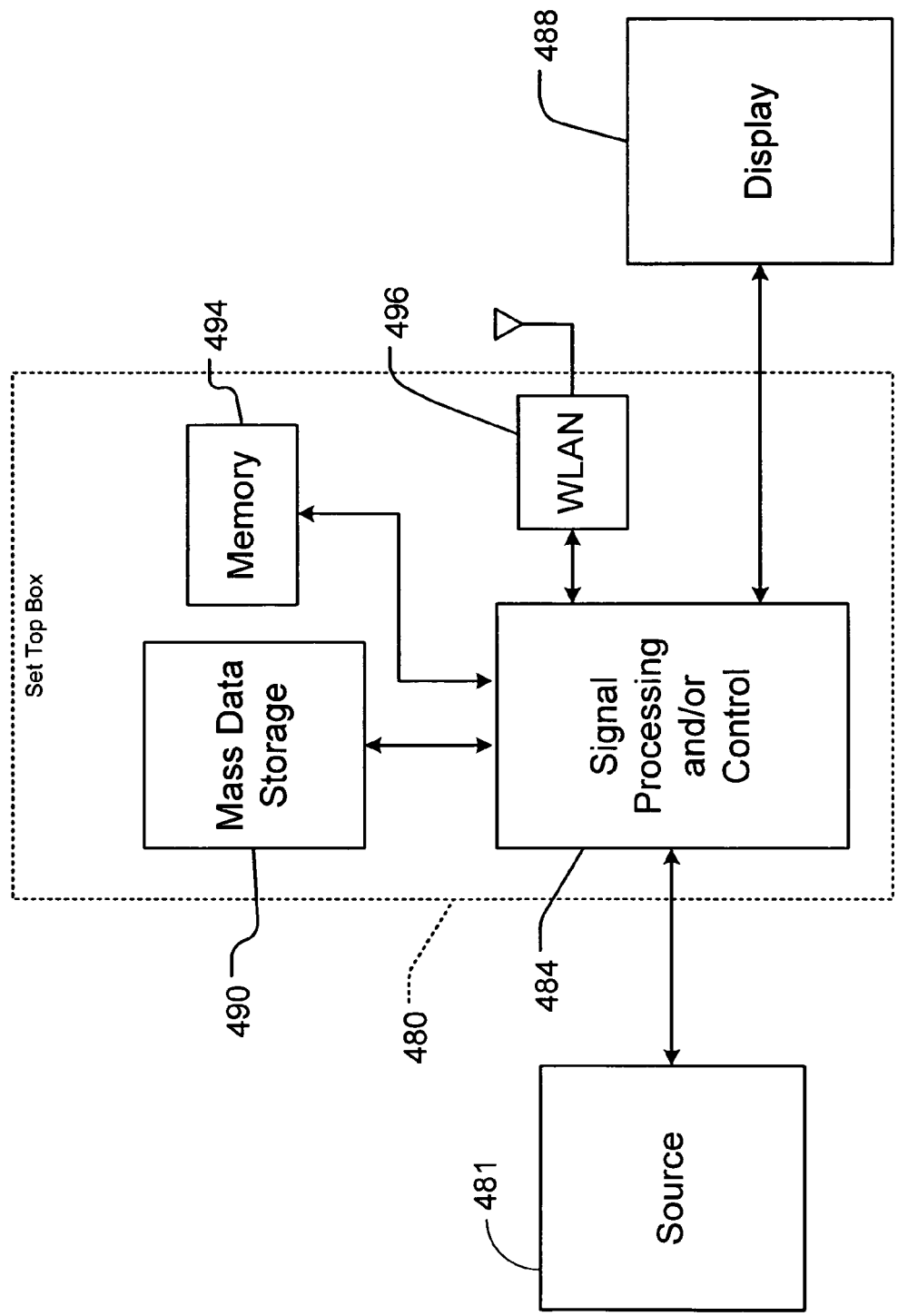

With reference to FIG. 8F, the present invention can be implemented in a set top box 480 as part of the signal processing and/or control circuits 484 or the mass data storage 490. The set top box 480 receives signals from a source 481 such as a broadband source and outputs standard and/or high definition audio/video signals suitable for a display 488 such as a television and/or monitor and/or other video and/or audio output devices. The signal processing and/or control circuits 484 and/or other circuits (not shown) of the set top box 480 may process data, perform coding and/or encryption, perform calculations, format data and/or perform any other set top box function.

The set top box 480 may communicate with mass data storage 490 that stores data in a nonvolatile manner. The mass data storage 490 may include optical and/or magnetic storage devices for example hard disk drives HDD and/or DVDs. At least one HDD may have the configuration shown in FIG. 8A and/or at least one DVD may have the configuration shown in FIG. 8B. The HDD may be a mini HDD that includes one or more platters having a diameter that is smaller than approximately 1.8". The set top box 480 may be connected to memory 494 such as RAM, ROM, low latency nonvolatile memory such as flash memory and/or other suitable electronic data storage. The set top box 480 also may support connections with a WLAN via a WLAN network interface 496.

Figure 8G:
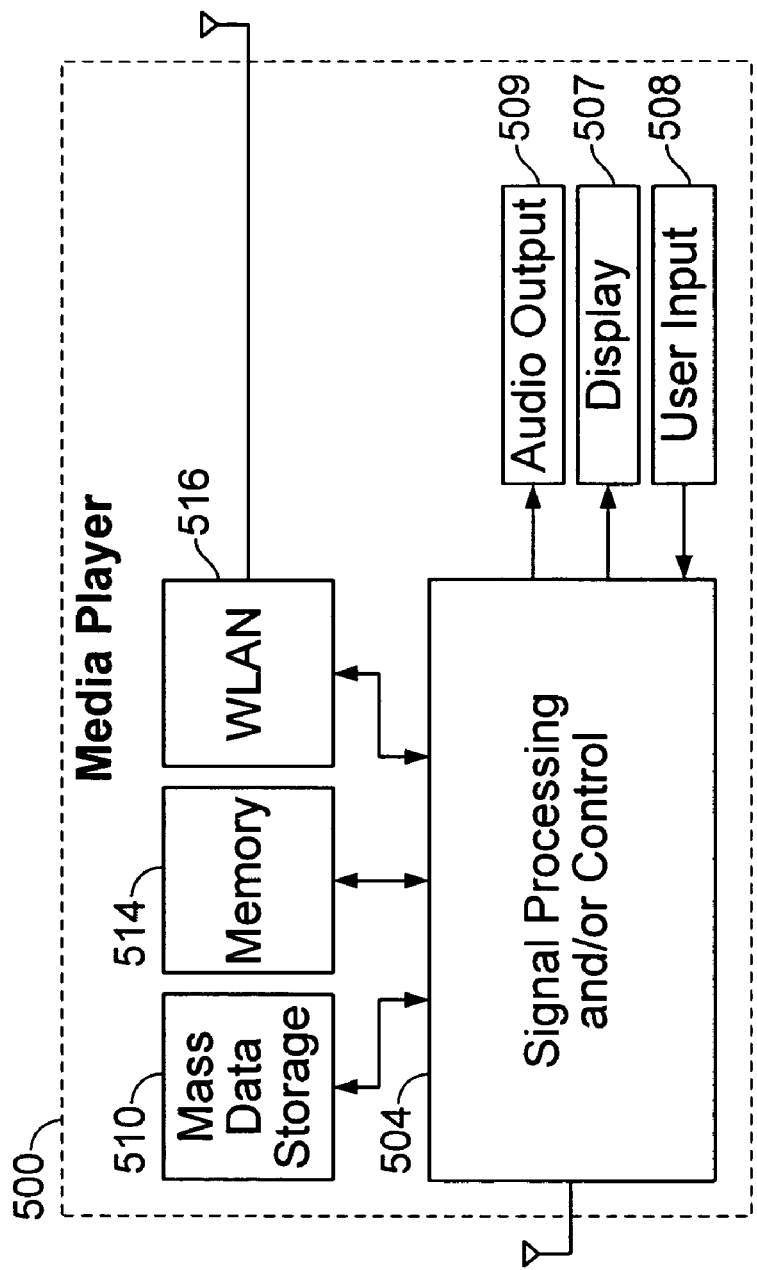

With reference to FIG. 8G, the present invention can be implemented in a media player 500 as part of the signal processing and/or control circuits 504 or the mass data storage 490. In some implementations, the media player 500 includes a display 507 and/or a user input 508 such as a keypad, touchpad and the like. In some implementations, the media player 500 may employ a graphical user interface (GUI) that typically employs menus, drop down menus, icons and/or a point-and-click interface via the display 507 and/or user input 508. The media player 500 further includes an audio output 509 such as a speaker and/or audio output jack. The signal processing and/or control circuits 504 and/or other circuits (not shown) of the media player 500 may process data, perform coding and/or encryption, perform calculations, format data and/or perform any other media player function.

The media player 500 may communicate with mass data storage 510 that stores data such as compressed audio and/or video content in a nonvolatile manner. In some implementations, the compressed audio files include files that are compliant with MP3 format or other suitable compressed audio and/or video formats. The mass data storage may include optical and/or magnetic storage devices for example hard disk drives HDD and/or DVDs. At least one HDD may have the configuration shown in FIG. 8A and/or at least one DVD may have the configuration shown in FIG. 8B. The HDD may be a mini HDD that includes one or more platters having a diameter that is smaller than approximately 1.8". The media player 500 may be connected to memory 514 such as RAM, ROM, low latency nonvolatile memory such as flash memory and/or other suitable electronic data storage. The media player 500 also may support connections with a WLAN via a WLAN network interface 516 or other antenna connections. Still other implementations in addition to those described above are contemplated.

Although only certain exemplary embodiments of this invention have been described in detail above, those skilled in the art will readily appreciate that many modifications are possible in the exemplary embodiments without materially departing from the novel teachings and advantages of this invention. For example, aspects of embodiments disclosed above can be combined in other combinations to form additional embodiments. Accordingly, all such modifications are intended to be included within the scope of this invention.

The invention claimed is:

1. A method of initializing a disk drive having a spindle motor for rotating a disk, a motor controller that is in communication with the spindle motor, and a drive controller that is in communication with the motor controller and that operates to at least read data from the disk, the method comprising:
   determining an initial angular position of the disk by using circuitry in the motor controller;
   spinning up the disk from the initial angular position by using circuitry in the motor controller;
   ramping up a speed of the disk, after spinning up the disk, by using circuitry in the motor controller;
   controlling the speed of the disk, after ramping up the speed of the disk, by executing on the motor controller a control program downloaded during a boot-up operation of the disk drive, wherein determining the initial angular position of the disk precedes a handover of control to the control program that executes on the motor controller.

2. The method of claim 1, wherein at least some portion of spinning up the disk precedes the handover of control to the control program that executes on the motor controller.

3. The method of claim 1, wherein the control program includes a set of firmware instructions downloaded from a memory unit.

4. The method of claim 1, further comprising: downloading the control program from a memory unit under the control of the drive controller.

5. The method of claim 1, wherein the motor controller and drive controller are on separate integrated circuits.

6. The method of claim 1, wherein the disk drive is a magnetic or optical disk drive.

7. The method of claim 1, wherein determining the initial angular position of the disk includes a cogging operation.

8. The method of claim 1, wherein spinning up the disk includes:
    extracting values for spin-up instructions from a nonvolatile memory; and
    executing the spin-up instructions for spinning up the disk.

9. The method of claim 8, wherein the spin-up instructions include:
    a bootstrap program for a controlling a blind table spin up of the disk.

10. An apparatus for controlling a disk drive having a spindle motor for rotating a disk, comprising:
    a drive controller to control at least reading from the disk; and
    a motor controller in communication with the spindle motor and the drive controller, the motor controller to determine the initial angular position of the disk, to ramp up a speed of the disk after spinning up the disk, and to control the speed of the disk after ramping up the speed of the disk by executing a control program downloaded during a boot-up operation of the disk drive, wherein determining the initial angular position of the disk precedes a handover of control to the control program that executes on the motor controller.

11. The apparatus of claim 10, wherein at least some portion of spinning up the disk precedes the handover of control to the control program that executes on the motor controller.

12. The apparatus of claim 10, wherein the control program includes a set of firmware instructions downloaded from a memory unit in communication with the drive controller.

13. The apparatus of claim 10, further comprising: a memory unit in communication with the drive controller, wherein the memory unit includes the control program as a set of firmware instructions.

14. The apparatus of claim 10, wherein the motor controller and drive controller are on separate integrated circuits.

15. The apparatus of claim 10, wherein the disk drive is a magnetic or optical disk drive.

16. The apparatus of claim 10, wherein determining the initial angular position of the disk includes a cogging operation.

17. The apparatus of claim 10, wherein determining the initial angular position of the disk includes a BEMF-sensing operation.

18. The apparatus of claim 10, wherein spinning up the disk includes:
    extracting spin-up instructions from a nonvolatile memory; and
    executing the spin-up instructions to spin up the disk.

19. The apparatus of claim 18, wherein the spin-up instructions include:
    a bootstrap program to control a blind table spin up of the disk.

20. An apparatus for controlling a disk drive having a spindle motor for rotating a disk, comprising:
    means for controlling the disk drive to control at least reading from the disk; and
    means for controlling the spindle motor in communication with the spindle motor and the disk-drive-controlling means, including means for determining the initial angular position of the disk, means for ramping up a speed of the disk after spinning up the disk, and means for controlling the speed of the disk after ramping up the speed of the disk by executing a control program downloaded during a boot-up operation of the disk drive, wherein determining the initial angular position of the disk precedes a handover of control to the control program that executes on the spindle-motor-controlling means.

21. The apparatus of claim 20, wherein at least some portion of spinning up the disk precedes the handover of control to the control program that executes on the spindle-motor-controlling means.

22. The apparatus of claim 20, wherein the control program includes a set of firmware instructions downloaded from a memory unit in communication with the disk-drive-controlling means.

23. The apparatus of claim 20, further comprising: a memory means for storing data in communication with the disk-drive-controlling means, wherein the memory means includes the control program as a set of firmware instructions.

24. The apparatus of claim 20, wherein the spindle-motor-controlling means and the disk-drive-controlling means are on separate integrated circuits.

25. The apparatus of claim 20, wherein the disk drive is a magnetic or optical disk drive.

26. The apparatus of claim 20, wherein determining the initial angular position of the disk includes a cogging operation.

27. The apparatus of claim 20, wherein determining the initial angular position of the disk includes a BEMF-sensing operation.

28. The apparatus of claim 20, wherein spinning up the disk includes:
    extracting spin-up instructions from a nonvolatile memory; and
    executing the spin-up instructions to spin up the disk.

29. The apparatus of claim 28, wherein the spin-up instructions include:
    a bootstrap program to control a blind table spin up of the disk.

30. The method of claim 1, wherein determining an initial angular position of the disk begins prior to download of said control program.

31. The method of claim 1, comprising controlling speed of the disk via the motor controller prior to determining an initial angular position.

32. The method of claim 1 comprising controlling speed of the disk while downloading said control program.

33. The method of claim 1 comprising increasing speed of the disk while downloading said control program.

34. The method of claim 1, wherein ramping up speed of the disk begins prior to the handover.

35. The method of claim 4, wherein the drive controller downloads said control program to said motor controller.

* * * * *

UNITED STATES PATENT AND TRADEMARK OFFICE
CERTIFICATE OF CORRECTION

PATENT NO. : 7,332,883 B1  
APPLICATION NO. : 11/352115  
DATED : February 19, 2008  
INVENTOR(S) : Ravishanker Krishnamoorthy et al.

Page 1 of 1

It is certified that error appears in the above-identified patent and that said Letters Patent is hereby corrected as shown below:

| | |
|---|---|
| Column 3, Line 33 | Insert -- with -- after "associated" |
| Column 4, Line 20 | Delete "a" after "by" |
| Column 5, Line 16 | Delete "operationally" and insert -- operational -- |
| Column 5, Line 35 | Delete "relatively" and insert -- relative -- |
| Column 6, Line 53 | Delete "is" after "conventionally" |
| Column 7, Line 38 | Delete "he" and insert -- the -- |
| Column 9, Line 6 | Insert -- is -- after "firmware" |
| Column 10, Line 54 | Delete "implement" and insert -- implements -- |
| Column 13, Line 28, Claim 9 | Delete "a" after "for" |

Signed and Sealed this

Twenty-fourth Day of June, 2008

JON W. DUDAS  
*Director of the United States Patent and Trademark Office*